United States Patent
Whitton et al.

(10) Patent No.: US 9,746,073 B2
(45) Date of Patent: Aug. 29, 2017

(54) CLUTCH CAPACITY DETECTION SYSTEMS AND METHODS

(75) Inventors: Matthew D. Whitton, Howell, MI (US); Timothy R. Stockdale, Woverine Lake, MI (US); Amanda P. Igel, Howell, MI (US); Nathaniel E. Wilke, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1706 days.

(21) Appl. No.: 13/013,256

(22) Filed: Jan. 25, 2011

(65) Prior Publication Data

US 2012/0191310 A1 Jul. 26, 2012

(51) Int. Cl.
| | |
|---|---|
| *F16D 48/06* | (2006.01) |
| *F16H 61/06* | (2006.01) |
| *F16D 48/02* | (2006.01) |
| *F16H 59/48* | (2006.01) |

(52) U.S. Cl.
CPC ......... *F16H 61/061* (2013.01); *F16D 48/066* (2013.01); *F16D 2048/0281* (2013.01); *F16D 2500/1085* (2013.01); *F16D 2500/30401* (2013.01); *F16D 2500/30412* (2013.01); *F16D 2500/30421* (2013.01); *F16D 2500/30818* (2013.01); *F16D 2500/30827* (2013.01); *F16D 2500/3111* (2013.01); *F16D 2500/3166* (2013.01); *F16D 2500/7042* (2013.01); *F16D 2500/7044* (2013.01); *F16D 2500/70406* (2013.01); *F16D 2500/70418* (2013.01); *F16D 2500/70668* (2013.01); *F16D 2500/7109* (2013.01); *F16H 59/48* (2013.01); *F16H 2061/064* (2013.01)

(58) Field of Classification Search
CPC ....................................................... F16H 61/016
USPC .................................. 701/68, 58, 59, 60, 66
See application file for complete search history.

(56) References Cited

U.S. PATENT DOCUMENTS

| | | | | |
|---|---|---|---|---|
| 4,653,350 A | * | 3/1987 | Downs et al. | 701/58 |
| 4,975,845 A | * | 12/1990 | Mehta | 701/59 |
| 5,272,630 A | * | 12/1993 | Brown et al. | 701/68 |
| 6,139,471 A | * | 10/2000 | Tsutsui et al. | 477/156 |
| 6,308,125 B1 | * | 10/2001 | Gleason et al. | 701/67 |
| 6,370,463 B1 | * | 4/2002 | Fujii et al. | 701/51 |
| 6,449,548 B1 | * | 9/2002 | Jain et al. | 701/56 |
| 6,915,890 B1 | * | 7/2005 | Whitton et al. | 192/85.63 |
| 7,731,630 B2 | * | 6/2010 | League et al. | 477/155 |

(Continued)

FOREIGN PATENT DOCUMENTS

GB 1011510.3 7/2010

*Primary Examiner* — Michael McCullough
*Assistant Examiner* — Michael E Butler (57) ABSTRACT

A system for a vehicle includes a desired pressure module, a valve actuation module, a filter module, and a capacity detection module. The desired pressure module selectively generates an increase in a desired pressure of hydraulic fluid for a clutch of an automatic transmission. The valve actuation module actuates a solenoid valve based on the desired pressure. The solenoid valve supplies hydraulic fluid to a regulator valve, and the regulator valve supplies hydraulic fluid to the clutch. The filter module filters an acceleration of a shaft of the automatic transmission to generate a filtered acceleration. The capacity detection module indicates whether the clutch reached torque carrying capacity based on the filtered acceleration.

20 Claims, 7 Drawing Sheets

(56) References Cited

U.S. PATENT DOCUMENTS

| | | |
|---|---|---|
| 2004/0236483 A1* | 11/2004 | Kimura .......................... 701/22 |
| 2005/0133334 A1* | 6/2005 | Whitton et al. ............ 192/85 R |
| 2006/0020384 A1* | 1/2006 | Smith et al. .................... 701/54 |
| 2006/0055349 A1* | 3/2006 | Nakayama et al. ........... 318/254 |
| 2006/0142117 A1* | 6/2006 | Colvin et al. ................. 477/107 |
| 2006/0178244 A1* | 8/2006 | Whitton et al. .............. 477/181 |
| 2007/0221462 A1* | 9/2007 | Rains ............................ 192/3.3 |
| 2008/0021622 A1* | 1/2008 | Katakura et al. ............... 701/61 |
| 2009/0112416 A1* | 4/2009 | Heap et al. ..................... 701/54 |
| 2009/0118915 A1* | 5/2009 | Heap et al. ..................... 701/51 |
| 2009/0118931 A1* | 5/2009 | Kaminsky et al. ............. 701/54 |
| 2009/0118936 A1* | 5/2009 | Heap et al. ..................... 701/54 |
| 2009/0118949 A1* | 5/2009 | Heap et al. ..................... 701/55 |
| 2009/0254255 A1* | 10/2009 | Seid et al. ...................... 701/60 |
| 2010/0286858 A1* | 11/2010 | Otokawa ........................ 701/22 |
| 2011/0077830 A1* | 3/2011 | Lochocki et al. .............. 701/68 |

* cited by examiner

CLUTCH CAPACITY DETECTION SYSTEMS AND METHODS

FIELD

The present disclosure relates to vehicle transmissions and more particularly to clutch control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque, which is output to a transmission. An automatic transmission of a vehicle may include a plurality of fluid controlled friction devices, such as clutches. A control module may engage and disengage one or more of the clutches according to a predefined pattern to establish different gear ratios (also called speed ratios) within the transmission.

A gear ratio may be defined in terms of a ratio of a transmission input shaft speed divided by a transmission output shaft speed. A gear shift from one gear ratio to another gear ratio may involve disengaging a first clutch that is associated with the current gear ratio, and engaging a second clutch associated with a next gear ratio. The clutch to be disengaged during the gear shift is referred to as the offgoing clutch, and the clutch to be engaged during the gear shift is referred to as the oncoming clutch. Gear shifts of this type may be referred to as clutch-to-clutch shifts because no speed responsive or freewheeling elements are used.

SUMMARY

A system for a vehicle includes a desired pressure module, a valve actuation module, a filter module, and a capacity detection module. The desired pressure module selectively generates an increase in a desired pressure of hydraulic fluid for a clutch of an automatic transmission. The valve actuation module actuates a solenoid valve based on the desired pressure. The solenoid valve supplies hydraulic fluid to a regulator valve, and the regulator valve supplies hydraulic fluid to the clutch. The filter module filters an acceleration of a shaft of the automatic transmission to generate a filtered acceleration. The capacity detection module indicates whether the clutch reached torque carrying capacity based on the filtered acceleration.

A method includes: selectively generating an increase in a desired pressure of hydraulic fluid for a clutch of an automatic transmission; actuating a solenoid valve based on the desired pressure; filtering an acceleration of a shaft of the automatic transmission to generate a filtered acceleration; and indicating whether the clutch reached torque carrying capacity based on the filtered acceleration. The solenoid valve supplies hydraulic fluid to a regulator valve, and the regulator valve supplies hydraulic fluid to the clutch.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A control module selectively determines and indicates whether a clutch of an automatic transmission is at or has reached torque carrying capacity. The clutch transfers torque between an input shaft and an output shaft when the clutch is at torque carrying capacity. The control module may selectively determine that the clutch is at torque carrying capacity, for example, when an acceleration of the input shaft or the output shaft changes by at least a predetermined amount over a predetermined period. However, noise and/or vibration transmitted to the input or output shaft may cause the acceleration to change by at least the predetermined amount over the predetermined period.

During steady-state driving conditions, the control module selectively attempts to lightly engage a clutch that is not being used to hold the gear ratio. If the clutch reaches torque carrying capacity, a slight tie-up will occur and a measurable deceleration will occur. The control module filters the acceleration (signal) to reject/suppress noise. The control module detects minimum and maximum values of the filtered acceleration generated during and in response to the attempt to engage the clutch. The control module records times at which the minimum and maximum values are generated. The control module determines whether the clutch reached torque carrying capacity based on a difference between the maximum and minimum values, the period between the times, and whether the maximum value occurred after the minimum value.

Figure 1:
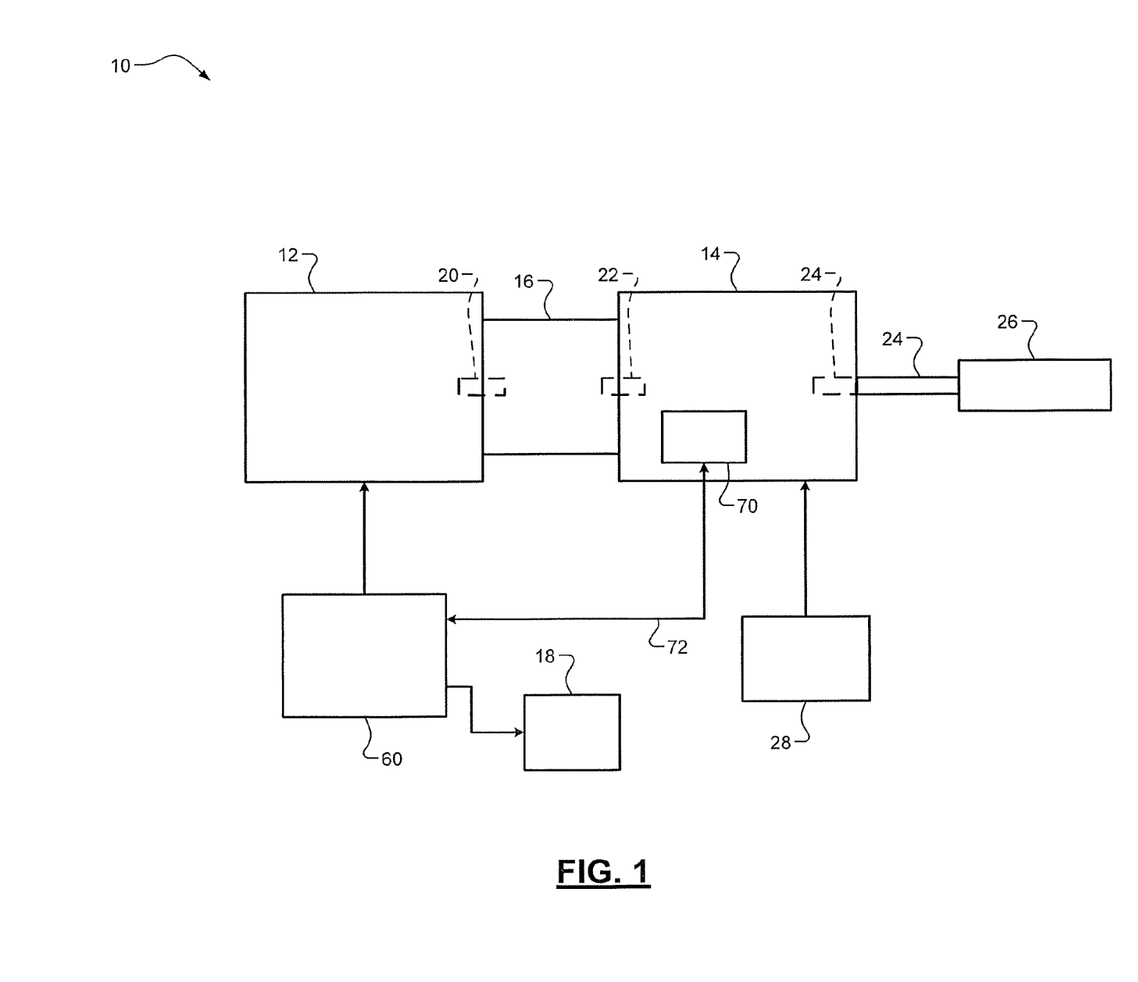
FIG. 1 is a functional block diagram of an example vehicle system according to the present disclosure.

Referring now to FIG. 1, a functional block diagram of an example vehicle system 10 is presented. An internal combustion engine 12 drives a transmission 14 via a torque converter 16. The engine 12 may include, for example, a spark-combustion type engine, a compression-combustion type engine, and/or another suitable type of engine. A vehicle may also include one or more electric motors and/or motor generator units (MGUs) 18.

The engine 12 outputs torque to the torque converter 16 via an engine output shaft 20, such as a crankshaft. The torque converter 16 supplies torque to the transmission 14 via a transmission input shaft 22. While the transmission 14 will be discussed as a clutch-to-clutch type transmission, a dual clutch transmission (DCT), or another suitable type of automatic transmission (including auto-manual transmissions) could be utilized.

The transmission 14 may include one or more gearsets (not shown) through which torque may be transferred between the transmission input shaft 22 and a transmission output shaft 24. The transmission output shaft 24 drives a driveline 26 of the vehicle system 10, and the driveline 26 transfers torque to wheels (not shown) of the vehicle. The transmission 14 may include one or more additional input shafts and one or more additional output shafts that are associated with various ones of the clutches and gearsets.

A range selector 28 enables a user to select a mode of operation of the transmission 14 including, but not limited to, a park mode, a reverse mode, a neutral mode, or one or more forward drive modes. The transmission 14 may be capable of achieving a plurality of gear ratios. For example only, the transmission 14 may be capable of achieving six or more forward gear ratios, a reverse gear ratio, and a neutral gear ratio. The transmission 14 may be capable of achieving a greater or lesser number of forward gear ratios and/or a greater number of reverse gear ratios in various implementations. A gear ratio may be defined as the ratio between the rotational speed of the transmission input shaft 22 and the rotational speed of the transmission output shaft 24.

An engine control module (ECM) 60 controls operation of the engine 12. The ECM 60 or another control module (not shown) may control operation of the one or more MGUs 18 in various implementations. A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data and/or communicate via a connection 72.

Figure 2:
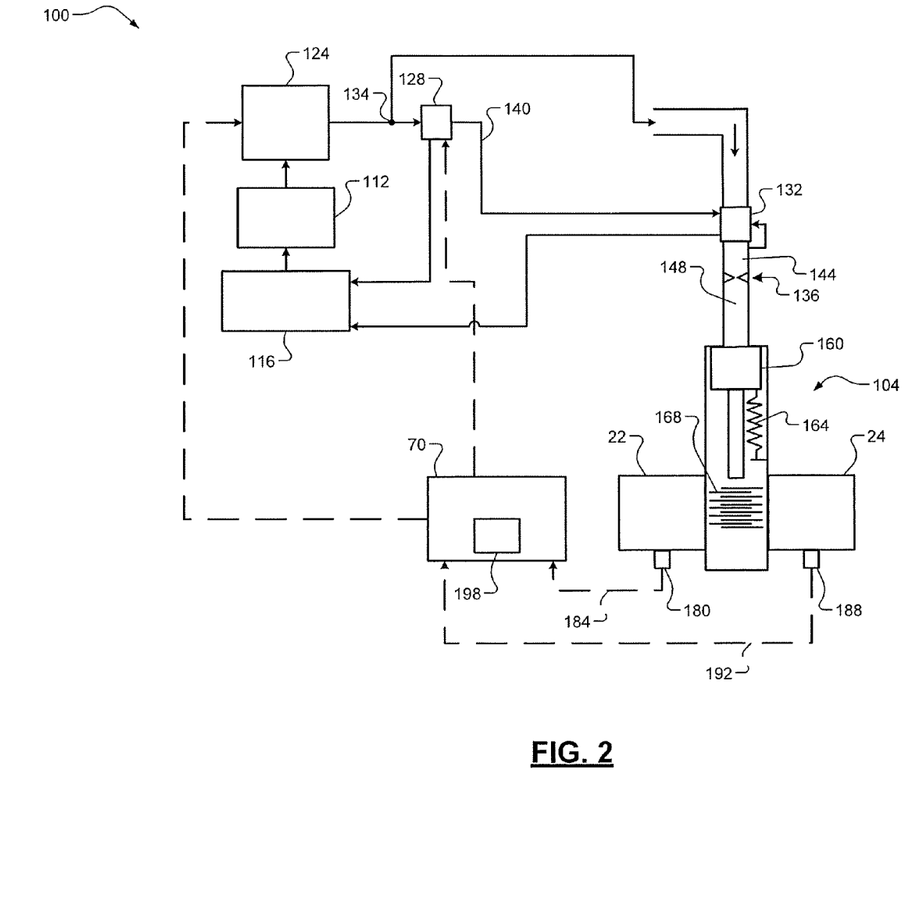
FIG. 2 is a functional block diagram of an example transmission system according to the present disclosure.

Referring now to FIG. 2, a diagram of an example implementation of a transmission system 100 is presented. In the example of FIG. 2, electrical communication is illustrated in dashed lines while fluid communication is illustrated in solid lines. The transmission 14 includes a plurality of clutches, such as clutch 104. While only the clutch 104 is shown, the transmission 14 includes more than one clutch. The clutches select the gear sets to be engaged within the transmission 14 at a given time. In other words, the clutches control the gear ratio. Different gear ratios may be established when different combinations of one or more of the clutches are engaged. The present disclosure will be discussed as it relates to the clutch 104, but the present disclosure is equally applicable to the other clutches of the transmission 14.

Transmission oil or another suitable hydraulic fluid is directed to and from the clutch 104 to control engagement and disengagement of the clutch 104. A pump 112 draws the transmission oil from a sump 116 or another suitable source of the transmission oil. The pump 112 pressurizes the transmission oil and provides transmission oil to a line pressure regulator 124.

The line pressure regulator 124 provides transmission oil to a solenoid valve 128 and a regulator valve 132. For example only, the solenoid valve 128 may be a variable bleed solenoid (VBS). The pressure of the transmission oil output by the line pressure regulator 124 may be referred to as a line pressure 134. The TCM 70 may control the line pressure regulator 124, for example, to achieve a desired value of the line pressure 134. The pressure of the transmission oil output by the solenoid valve 128 to the regulator valve 132 may be referred to as a commanded pressure 140. The TCM 70 may control the solenoid valve 128 to achieve a desired value of the commanded pressure 140 and/or to bleed transmission oil back to the sump 116 from the solenoid valve 128.

The regulator valve 132 controls the flow of the transmission oil to the clutch 104. The regulator valve 132 outputs the transmission oil to an orifice 136. The regulator valve 132 may also provide transmission oil back to the sump 116. The orifice 136 limits the rate at which the transmission oil flows between the regulator valve 132 and the clutch 104. The pressure of the transmission oil between the regulator valve 132 and the orifice 136 may be referred to as a feedback pressure 144. The pressure of the transmission oil between the orifice 136 and the clutch 104 may be referred to as a clutch pressure 148.

Among other things, the clutch 104 includes a piston 160, a return spring 164, and a clutch pack 168. The return spring 164 urges the piston 160 away from the clutch pack 168. When the clutch pressure 148 is greater than the pressure applied by the return spring 164 to the piston 160, the transmission oil moves the piston toward the clutch pack 168. As long as the clutch pressure 148 is sufficient to overcome the return spring 164, the piston 160 will continue to move toward the clutch pack 168 until the piston 160 makes physical contact with the clutch pack 168.

When the clutch pressure 148 is sufficient for a long enough period for the piston 160 to make contact with the clutch pack 168, the clutch pack 168 is engaged such that torque is transferred between an associated input and output shaft, such as the input and output shafts 22 and 24, respectively. When the clutch pack 168 is engaged to transfer (carry) torque between the input and output shafts 22 and 24, respectively, the clutch 104 may be said to be at torque carrying capacity or, more simply, at capacity.

An input shaft speed sensor 180 measures rotational speed of the transmission input shaft 22 and generates a signal indicative of the speed 184. An output shaft speed sensor 188 measures rotational speed of the transmission output shaft 24 and generates a signal indicative of the speed 192. The TCM 70 receives the signals from the input and output shaft speed sensors 184 and 188. The TCM 70 may also receive signals from one or more other sensors (not shown).

The TCM 70 may include a learning control module 198. The learning control module 198 may selectively initiate a learn event for the clutch 104 during steady-state driving conditions. Steady-state driving conditions may be present, for example, when driving at a relatively constant speed and no gear shifts are occurring. The TCM 70 may selectively initiate a learn event for the clutch 104 when the clutch 104 is disengaged.

The learning control module 198 may initiate a learn event for the clutch 104 to learn a minimum value of the clutch pressure 148 to overcome the return spring 164. The minimum clutch pressure may be referred to as a return spring pressure. Alternatively or additionally, the learning control module 198 may initiate a learn event for the clutch 104 to learn a minimum volume of the transmission oil input to the clutch 104 (from empty) at which the clutch 104 will begin to be at capacity. The minimum volume may be referred to as a fill volume of the clutch 104. The learning control module 198 may store the return spring pressure and the fill volume associated with each of the clutches of the transmission 14 in memory. The TCM 70 may use stored return spring pressures and/or fill volumes during operation of the transmission 14, such as during gear shifts.

Figure 3:
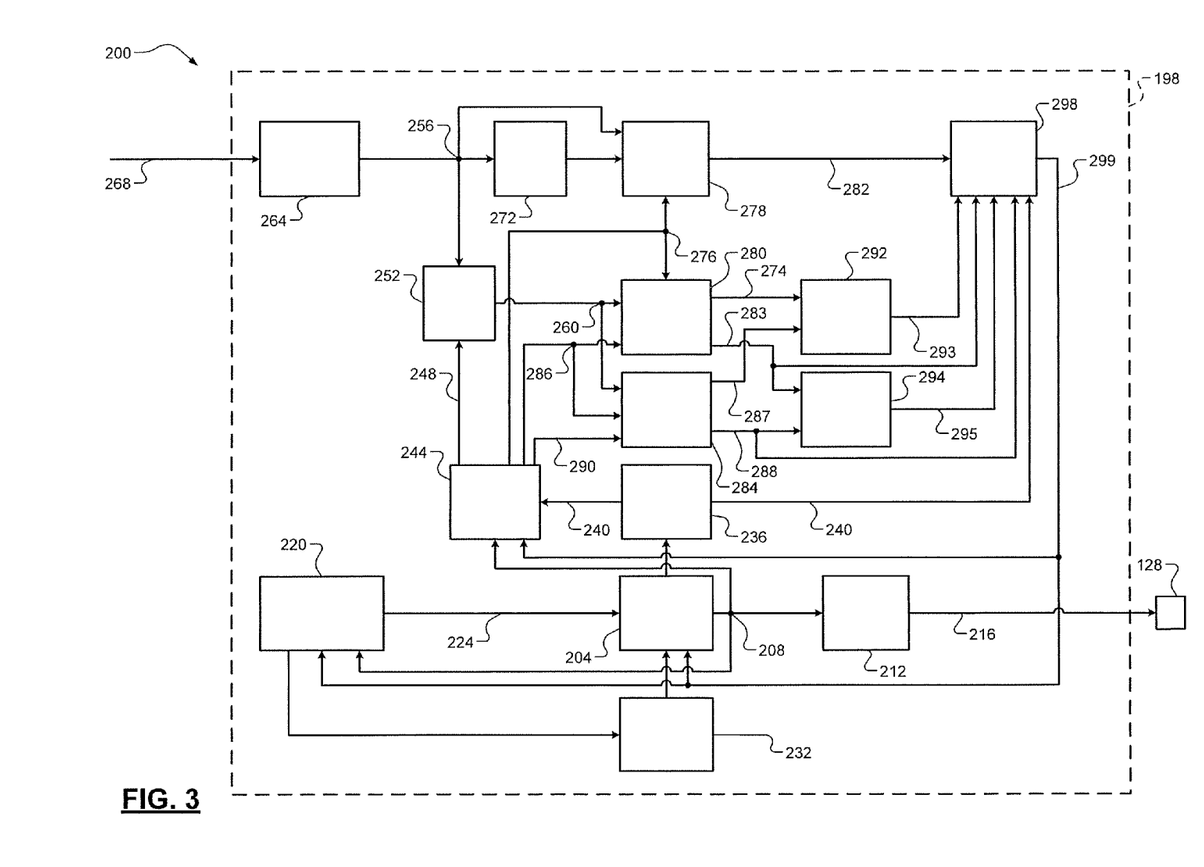
FIG. 3 is a functional block diagram of an example clutch capacity detection system according to the present disclosure.

Referring now to FIG. 3, a functional block diagram of an example clutch capacity detection system 200 is presented. The learning control module 198 may include a desired pressure module 204, a valve actuation module 212, a parameter learning module 220, a storage module 232, a remaining time timer 236, a state control module 244, and a filter module 252. The learning control module 198 may also include an acceleration module 264, a buffer 272, a noise detection module 278, a min detection module 280, a max detection module 284, a difference module 292, a time difference module 294, and a capacity detection module 298.

The desired pressure module 204 generates a desired pressure 208. The desired pressure 208 corresponds to a desired level of the commanded pressure 140. The valve actuation module 212 generates a command pressure signal 216 based on the desired pressure 208. The valve actuation module 212 controls actuation of the solenoid valve 128 using the command pressure signal 216. The solenoid valve 128 actuates based on the command pressure signal 216. For example only, the solenoid valve 128 may be controlled using pulse width modulation (PWM), and the valve actuation module 212 may determine a PWM duty cycle based on the desired pressure 208.

The parameter learning module 220 selectively triggers performance of a learn event for the clutch 104. The parameter learning module 220 may trigger the learn event for the clutch 104 when the clutch 104 is disengaged during approximately steady-state driving conditions. Approximately steady-state driving conditions may be present, for example, when a vehicle speed is approximately constant (greater than zero) for a predetermined period and a gear shift event is not occurring.

The parameter learning module 220 may generate a trigger signal 224 to initiate performance of the learn event. The parameter learning module 220 may generate the trigger signal 224 to indicate the parameter of the clutch 104 to be learned. The parameter to be learned may include the fill volume of the clutch 104 or the return spring pressure. The parameter learning module 220 may generate the trigger signal to indicate the fill volume or the return spring pressure. The desired pressure module 204 generates the desired pressure 208 in a predetermined manner for the learn event.

Figure 4:
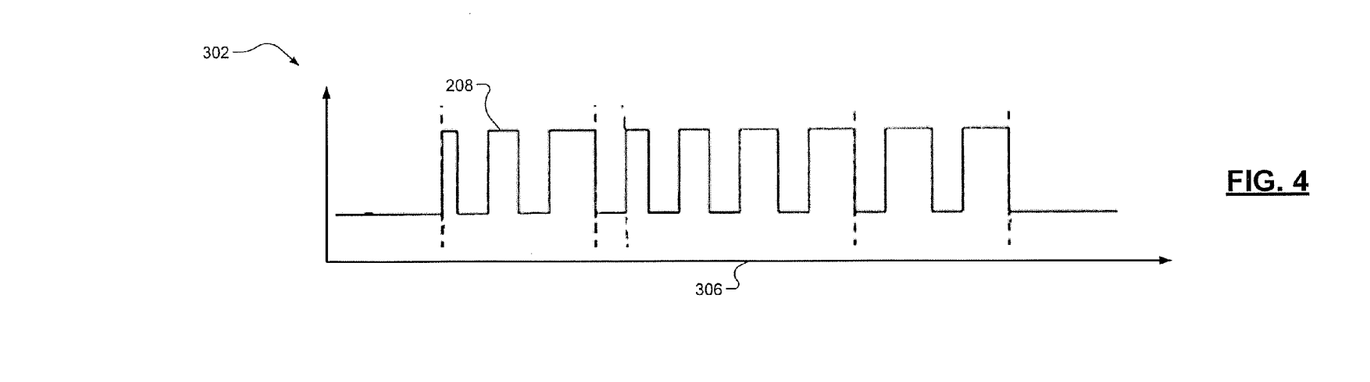
FIG. 4 is an example graph of desired pressure as a function of time for a clutch fill volume learn event according to the present disclosure.

FIG. 4 includes an example graph 302 of the desired pressure 208 as a function of time 306 for a fill volume learn event of the clutch 104. Referring also to FIG. 3, the desired pressure module 204 may generate one or more pulses in the desired pressure 208 during the learn event. Example pulses are shown, however, the duration of the pulses may vary from how they are shown in FIG. 3 in various implementations. For example only, the duration of the pulses generated for a learn event may incrementally increase until the clutch 104 reaches capacity.

The parameter learning module 220 may determine (learn) the fill volume based on a fill period between when filling of the clutch 104 begins (e.g., a pulse in the desired pressure 208 begins) and when the filling of the clutch 104 ends (e.g., the pulse in the desired pressure 208 ends). The parameter learning module 220 may determine the fill volume further based on a temperature of the transmission oil and a difference between the magnitude of the pulses in the desired pressure 208 and the return spring pressure. For example only, a fill rate (Q) may be determined as a function of the temperature of the transmission oil and the difference between the magnitude of the pulses and the return spring pressure, and the fill volume may be determined as a product of the fill rate and the fill period.

Figure 5:
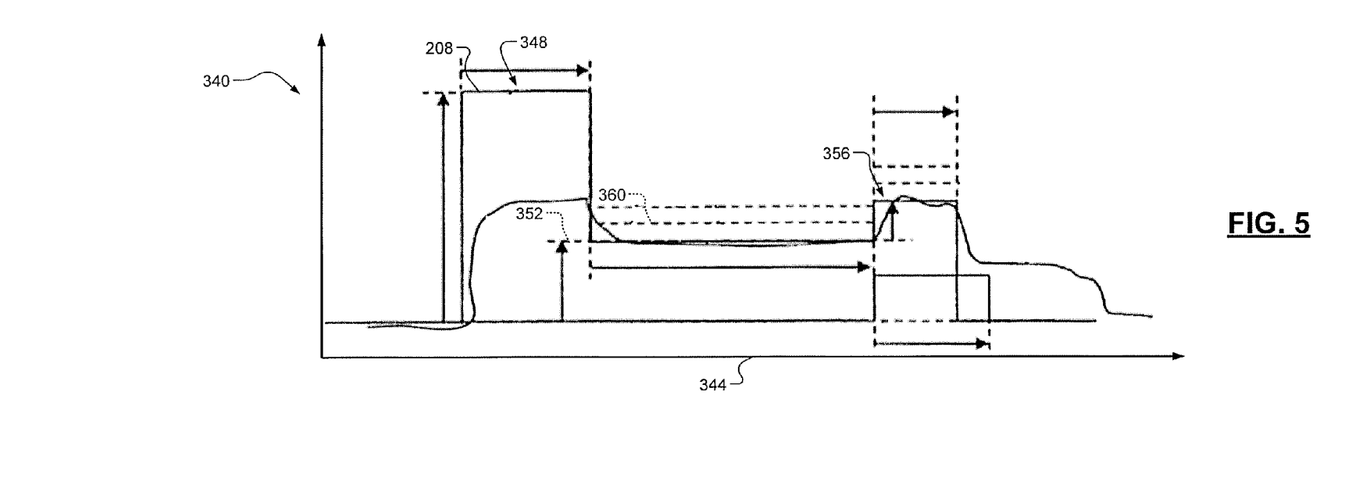
FIG. 5 is an example graph of desired pressure as a function of time for a return spring pressure learn event according to the present disclosure.

FIG. 5 includes an example graph 340 of the desired pressure 208 as a function of time 344 for a return spring pressure learn event of the clutch 104. Referring also to FIG. 3, the desired pressure module 204 may generate a first pulse 348 in the desired pressure 208 then reduce the desired pressure 208 to a predetermined plateau pressure 352 for the return spring pressure learn event. In various implementations, the desired pressure module 204 may omit generating the first pulse 348 and instead maintain the desired pressure 208 at the predetermined plateau pressure 352. The desired pressure module 204 may later generate a second pulse 356 in the desired pressure 208 (relative to the plateau pressure). The magnitude of the second pulse 356 is greater than the predetermined plateau pressure 352. The magnitude of the second pulse 356 may be less than the magnitude of the first pulse 348 in various implementations and under various circumstances.

When the clutch 104 reaches capacity, the parameter learning module 220 may determine that the return spring pressure is equal to the predetermined plateau pressure 352. If the clutch 104 is not at capacity within the predetermined period, the desired pressure module 204 may drain the clutch 104 and begin the process over again of generating a first pulse (optional), maintaining at a predetermined plateau pressure, and generating a second pulse. However, instead of using the predetermined plateau pressure 352, the desired pressure module 204 may use a second predetermined plateau pressure 360 that is greater than the predetermined plateau pressure 352 by a predetermined amount. The desired pressure module 204 may also increase the magnitude of the second pulse 356 by the predetermined amount. The desired pressure module 204 may repeat this process of incrementally increasing the plateau pressure used and the magnitude of the second pulse until the clutch 104 reaches capacity, at which point the return spring pressure is known.

Referring back to FIG. 3, the parameter learning module 220 stores the learned fill volume and the return spring pressure in the storage module 232 by the clutch 104. The storage module 232 may include a mapping of fill volumes and return spring pressures indexed by clutch. The desired pressure module 204 may use a stored fill volume and/or a stored return spring pressure in controlling an associated clutch, such as for a gear shift involving engaging the associated clutch.

During a learn event, the desired pressure module 204 may selectively initialize and start the remaining time timer 236. The desired pressure module 204 may initialize the remaining time timer 236 each time when the desired pressure module 204 begins generating a pulse in the desired pressure 208 when the clutch 104. Each pulse in the desired pressure 208 generated during a learn event is expected to cause the clutch 104 to reach capacity. The desired pressure module 204 may initialize the remaining time timer 236 to the duration (i.e., period) of the pulse and start the remaining time timer 236 decrementing down toward zero. In this manner, the remaining time timer 236 tracks the period 240 remaining until the pulse will end.

Figure 6:
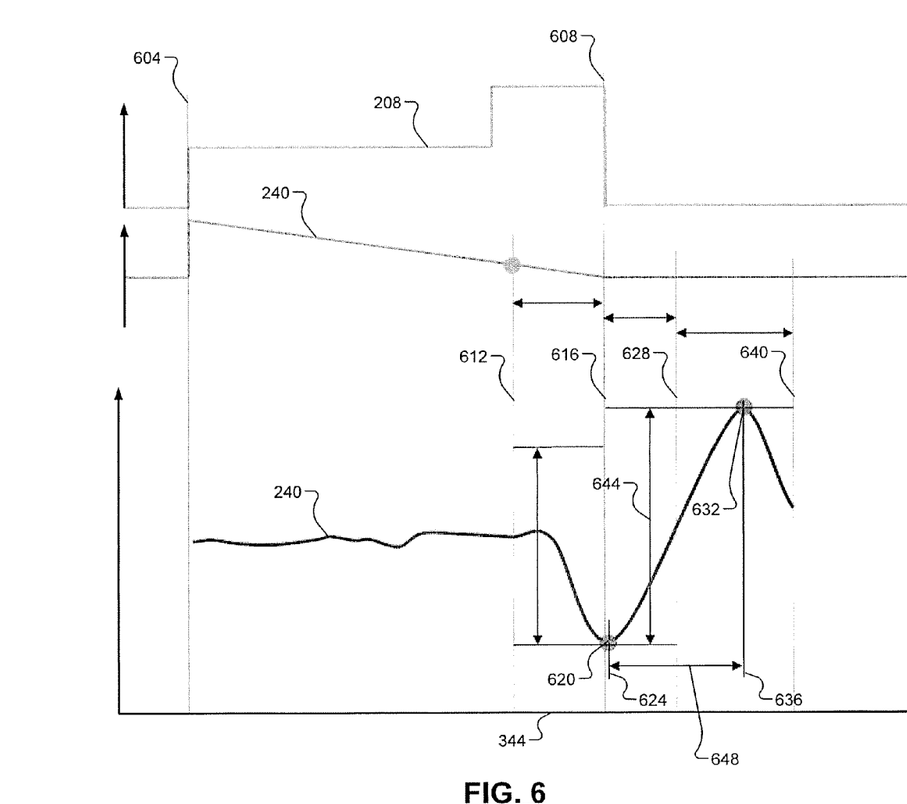
FIG. 6 is an example graph of desired pressure, remaining time, and acceleration, as functions of time according to the present disclosure.

An example pulse generated in the desired pressure 208 as a function of time is shown in FIG. 6. In the example of FIG. 6, the desired pressure module 204 begins generating the pulse at approximately time 604 and the pulse ends at approximately time 608. An example of the period 240 tracked by the remaining time timer 236 is also shown in FIG. 6. The period 240 is initialized to the duration of the pulse at approximately time 604, and the period 240 reaches a value of zero at approximately time 608.

As stated above, the learn event involves generating one or more pulses in the desired pressure 208. One count event is associated with each of the one or more pulses. The state control module 244 controls the performance of the one or more count events. A count event involves determining whether conditions occur that are indicative of the clutch 104 reaching capacity as a result of the generation of the pulse in the desired pressure 208. In various implementations, each count event may be said to include four sequential states, a first (filtering) state, a second (minimum) state, a third (minimum/maximum) state, and a fourth (maximum) state.

The first state of the count event involves beginning the filtering. The state control module 244 triggers 248 the filter module 252 to begin filtering when the first state begins (e.g., when the period 240 is not equal to zero). Once triggered, the filter module 252 applies a filter to an acceleration 256 to produce a filtered acceleration 260. An example trace of the filtered acceleration 260 is shown in FIG. 6. The filter module 252 may begin applying the filter at approximately time 604.

The acceleration module 264 determines the acceleration 256 based on a measured speed 268 of a shaft of the transmission 14. The measured speed 268 may be the input shaft speed 184, the output shaft speed 192, or another suitable speed. The acceleration module 264 may determine the acceleration 256 by determining a derivative of the measured speed 268. For example only, the filter applied by the filter module 252 may be a first-order lag filter.

The acceleration module 264 also stores the acceleration 256 in the buffer 272 with a predetermined number of previous values of the acceleration 256. For example only, the predetermined number may be eight or another suitable number. The buffer 272 includes the predetermined number of the most recent values of the acceleration 256. For example only, the buffer 272 may include a ring buffer.

The state control module 244 may transition to the second state of the count event when the period 240 is less than a first predetermined period. The first predetermined period is greater than zero and less than the duration of the pulse. In this manner, the state control module 244 begins the second state before the end of the pulse (and before the period 240 reaches zero). In the example of FIG. 6, for example, the state control module 244 may transition to the second state at approximately time 612.

The second state of the count event involves determining whether the acceleration 256 is noisy and determining a minimum value 274 of the filtered acceleration 260. The state control module 244 enables the noise detection module 278 and the min detection module 280 via a second state signal 276 when the period 240 is less than the first predetermined period. When the period 240 is less than the first predetermined period, the state control module 244 may also reset a window timer (not shown) to a predetermined reset value (e.g., 0), begin the window timer incrementing, and set a window limit to a second predetermined period for the second state. In the example of FIG. 6, the second predetermined period is defined by time 612 and time 616.

The noise detection module 278 determines whether there is noise in the acceleration 256 when enabled. The noise detection module 278 may determine whether there is noise in the acceleration 256 based on a difference between the acceleration 256 and a predetermined one of the previous values of the acceleration 256 stored in the buffer 272. For example only, the noise detection module 278 may determine that there is noise in the acceleration 256 when the difference is greater than a predetermined difference. Additionally or alternatively, the noise detection module 278 may determine that there is noise in the acceleration 256 when the acceleration 256 changes by more than a predetermined amount during the second state. The noise detection module 278 generates a noise signal 282 that indicates whether noise has been detected in the acceleration 256 during the capacity detection event.

The min detection module 280 determines the minimum value 274 of the filtered acceleration 260 when enabled. The min detection module 280 may determine the minimum value 274 based on whether the filtered acceleration 260 is less than the minimum value 274 and whether the previous value of the filtered acceleration 260 is greater than present value of the filtered acceleration 260. If both are true, the min detection module 280 may set the minimum value 274 equal to the filtered acceleration 260. If one or both are false, the min detection module 280 may maintain the minimum value 274. The min detection module 280 sets a minimum time 283 corresponding to the timestamp of the minimum value 274. In the example of FIG. 6, the minimum value 274 is illustrated by 620. The minimum time 283, corresponding to the minimum value 274, occurs at approximately time 624 in the example of FIG. 6.

When the window timer is greater than or equal to the window limit during the second state, the state control module 244 may disable the noise detection module 278 via the second state signal 276 and enable the min detection module 280 and the max detection module 284 via a third state signal 286. When the window timer is greater than or equal to the window limit, the state control module 244 may also reset the window timer to the predetermined reset value, begin the window timer incrementing, and set the window limit to a third predetermined period for the third state of the count event. In the example of FIG. 6, the third predetermined period is defined by time 616 and time 628. While the minimum value 274 is shown as occurring within the third predetermined period in the example of FIG. 6, the minimum value 274 may occur within the second predetermined period.

The min detection module 280 may continue determining the minimum value 274 as described above. The max detection module 284 determines a maximum value 287 of the filtered acceleration 260 when enabled. The max detection module 284 may determine the maximum value 287 based on whether the filtered acceleration 260 is greater than the maximum value 287 and whether the previous value of the filtered acceleration 260 is less than present value of the filtered acceleration 260. If both are true, the max detection module 284 may set the maximum value 287 equal to the filtered acceleration 260. If one or both are false, the max detection module 284 may maintain the maximum value 287. The max detection module 284 sets a maximum time 288 corresponding to the timestamp of the maximum value 287. In the example of FIG. 6, the maximum value 287 is illustrated by 632. The maximum time 288, corresponding to the maximum value 287, occurs at approximately time 636 in the example of FIG. 6.

When the window timer is greater than or equal to the window limit during the third state, the state control module 244 may disable the min detection module 280 via the third state signal 286 and enable the max detection module 284 via a fourth state signal 290. When the window timer is greater than or equal to the window limit, the state control module 244 may also reset the window timer to the predetermined reset value, begin the window timer incrementing, and set the window limit to a fourth predetermined period for the fourth state of the count event. In the example of FIG. 6, the fourth predetermined period is defined by time 628 and time 640. The max detection module 284 may continue determining the maximum value 287 as described above. While the maximum value 287 is shown as occurring within the fourth predetermined period in the example of FIG. 6, the maximum value 287 may occur within the third predetermined period.

When the window timer is greater than or equal to the window limit during the fourth state, the state control module 244 disables the max detection module 284 via the fourth state signal 290. The difference module 292 determines an acceleration difference 293 based on the minimum value 274 and the maximum value 287. More specifically, the difference module 292 may set the acceleration difference 293 equal to the maximum value 287 minus the minimum value 274. The acceleration difference 293 is illustrated by 644 in the example of FIG. 6.

The time difference module 294 determines a time difference 295 based on the maximum time 288 and the minimum time 283. More specifically, the difference module 292 may set the time difference 295 equal to the maximum time 288 minus the minimum time 283. The time difference 295 is illustrated by 648 in the example of FIG. 6. The difference module 292 and the time difference module 294 provide the acceleration difference 293 and the time difference 295, respectively, to the capacity detection module 298.

When the window timer is greater than or equal to the window limit during the fourth state, the state control module 244 may disable the max detection module 284 via the fourth state signal 290 and enable the capacity detection module 298. The capacity detection module 298 may be enabled via the fourth state signal 290 or in another suitable manner.

The capacity detection module 298 determines whether the clutch 104 reached capacity as a result of the pulse based on whether noise was detected during the count event, the minimum value 274, the maximum value 287, the minimum time 283, and/or the maximum time 288. For example only, the capacity detection module 298 may determine that the clutch 104 reached capacity when no noise was detected, the acceleration difference 293 is greater than a first predetermined acceleration, the maximum time 288 is greater than (i.e., later than) the minimum time 283, and the time difference 295 is less than or equal to a predetermined maximum period. Additionally or alternatively, the capacity detection module 298 may determine that the clutch 104 reached capacity when the acceleration difference 293 is greater than a second predetermined acceleration. The second predetermined acceleration is greater than the first predetermined acceleration, and the second predetermined acceleration may be set based on a maximum value of the acceleration difference 293 attributable to a greatest possible amount of noise.

The capacity detection module 298 generates a capacity signal 299 that indicates whether the clutch 104 reached capacity during the count event. For example only, the capacity detection module 298 may set the capacity signal 299 to an active state when the clutch 104 reached capacity during the count event. The capacity detection module 298 may latch the capacity signal 299 in the active state for a predetermined period.

The parameter learning module 220 receives the capacity signal 299 from the capacity detection module 299. During a learning event, the parameter learning module 299 tracks the number (e.g., X) of times that the clutch 104 reached capacity during the last predetermined number (e.g., Y) of count events. Once at least the predetermined number Y of count events have occurred during the learning event, the parameter learning module 220 may learn the value to be learned (i.e., the return spring pressure or the fill volume) and end the learning event when X is greater than a predetermined value. For example only, the parameter learning module 220 may learn the value to be learned and end the learning event when the clutch 104 reached capacity during at least 3 out of the last 5 count events. If X is not greater than the predetermined value, the parameter learning module 220 may drain the clutch 104 and begin generating a next pulse in the desired pressure 208 for a next count event of the learning event. One or more other modules may additionally or alternatively use the capacity signal 299.

Figure 7A:
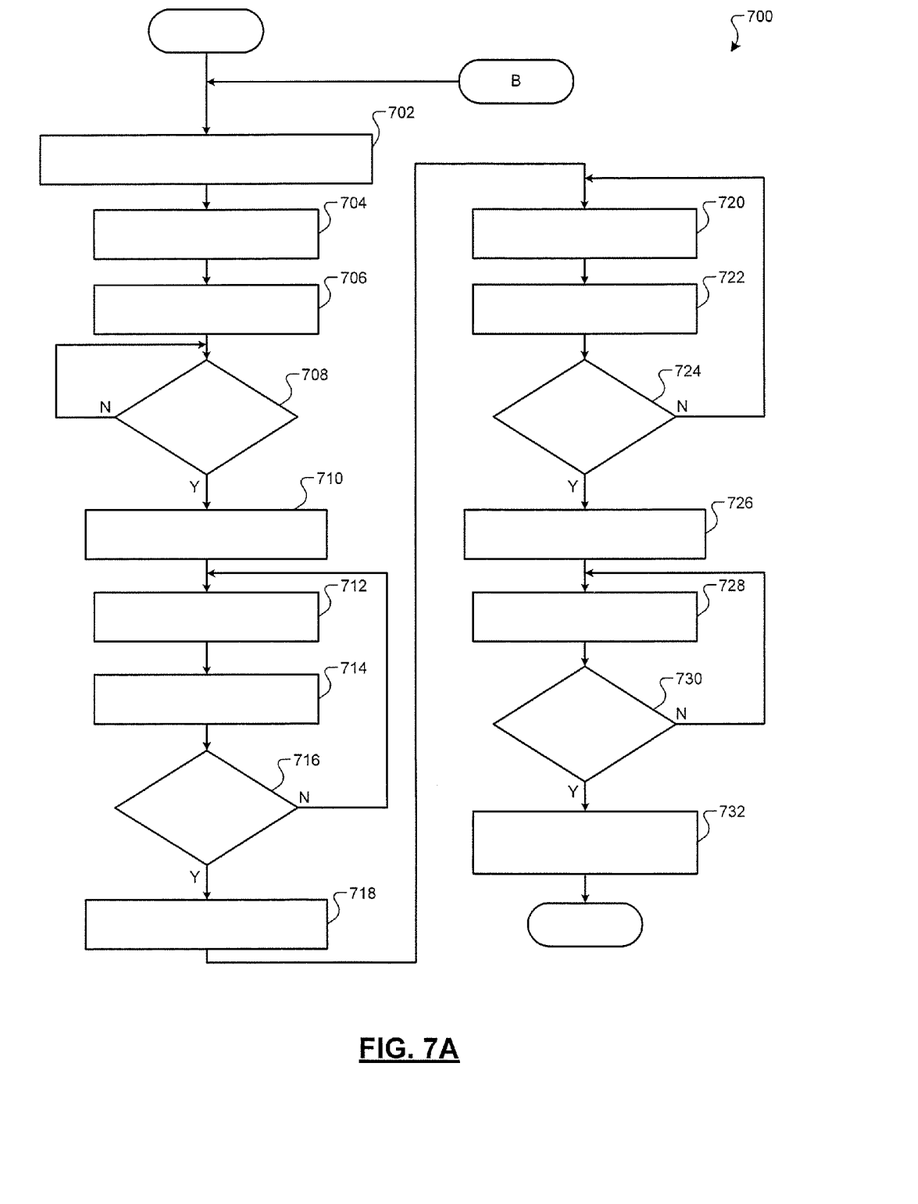
FIGS. 7A-7B are a flowchart depicting an example method of determining when a clutch reached capacity according to the present disclosure.
Figure 7B:
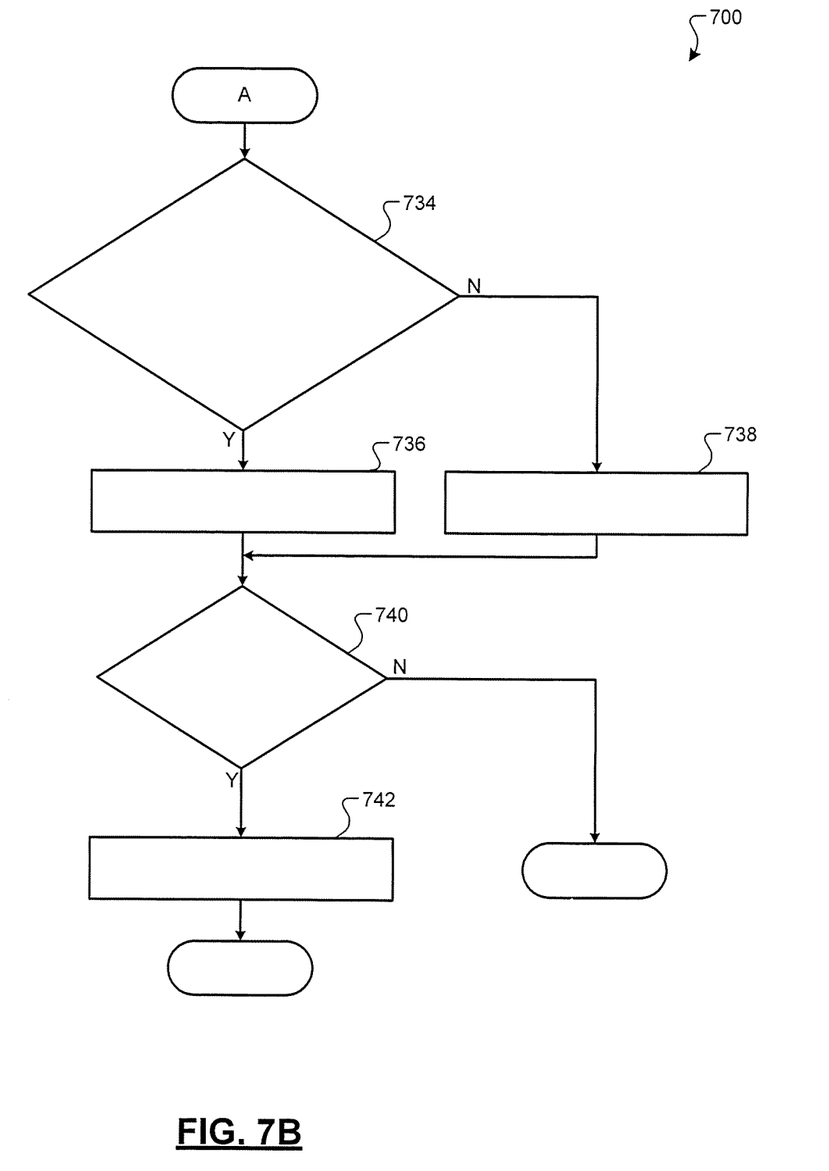

Referring now to FIGS. 7A-7B, a flowchart depicting an example method 700 of determining whether the clutch 104 reached capacity is presented. Control may begin with 702 where control begins generating a pulse in the desired pressure 208 from which the clutch 104 is expected to reach capacity. Control initializes the remaining time timer 236 at 704 to the duration of the pulse. Control also starts the remaining time timer 236 counting down toward zero at 704. Control begins applying the filter to the acceleration 256 at 706.

At 708, control determines whether the remaining time timer 236 is less than the first predetermined period. If true, control continues with 710; if false, control may remain at 708. The first predetermined period is less than the duration of the pulse and greater than zero. Control resets the window timer and sets the window limit to the second predetermined period for the second state at 710. At 712, control determines the minimum value 274 of the filtered acceleration 260 and the minimum time 283 associated with the minimum value 274. Control determines whether noise is present in the acceleration 256 at 714.

At 716, control determines whether the window timer is greater than or equal to the window limit. If true, control continues with 718; if false, control may return to 712. At 718, control resets the window timer and sets the window limit to the third predetermined period for the third state. Control continues to determine the minimum value 274 and the minimum time 283 at 720. At 722, control determines the maximum value 287 of the filtered acceleration 260 and the maximum time 288 associated with the maximum value 287.

Control determines whether the window timer is greater than or equal to the window limit at 724. If true, control continues with 726; if false, control may return to 720. At 726, control resets the window timer and sets the window limit to the fourth predetermined period for the fourth state. Control continues to determine the maximum value 287 and the maximum time 288 at 728. Control determines whether the window timer is greater than or equal to the window limit at 730. If true, control continues with 732; if false, control may return to 728.

At 732, control determines the acceleration difference 293 and the time difference 295. Control may set the acceleration difference 293 equal to the maximum value 287 minus the minimum value 274. Control may set the time difference 295 equal to the maximum time 288 minus the minimum time 283. In this manner, the time difference 295 is positive when the maximum time 288 is after the minimum time 283. Control proceeds with 734 in FIG. 7B.

At 734, control determines whether: (1) no noise has been detected, (2) the acceleration difference 293 is greater than the first predetermined acceleration, (3) the maximum time 288 is after the minimum time 283, and (4) the time difference 295 is less than or equal to the predetermined maximum period; or whether (5) the acceleration difference 293 is greater than the second predetermined acceleration that is greater than the first predetermined acceleration. If (1)-(4) are true or if (5) is true, control proceeds with 736. If one or more of (1)-(4) are false and (5) is false, control may proceed with 738, which is discussed further below.

At 736, control indicates that the clutch 104 reached capacity during the count event, and control continues to 740. At 738, control indicates that the clutch 104 did not reach capacity during the count event, and control continues to 740. Control determines whether the clutch 104 reached capacity during at least M of last N count events of the learning event. If true, control learns the value to be learned and ends the learning event at 742, and control may end. If false, control may drain the clutch 104, and control may return to 702 (FIG. 7A) to continue the learn event by generating a next pulse in the desired pressure 208 for a next count event. M and N are integers greater than 1, and N is greater than or equal to M. For example only, N may be 5 and M may be 3.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a desired pressure module that selectively generates an increase in a desired pressure of hydraulic fluid for a clutch of an automatic transmission;
a valve actuation module that actuates a solenoid valve based on the desired pressure,
wherein the solenoid valve supplies hydraulic fluid to a regulator valve, and the regulator valve supplies hydraulic fluid to the clutch;
a filter module that filters an acceleration of a shaft of the automatic transmission to generate a filtered acceleration; and
a capacity detection module that indicates whether the clutch reached torque carrying capacity based on the filtered acceleration.

2. The system of claim 1 wherein the desired pressure module generates the increase when a vehicle speed is greater than zero, the clutch is not carrying torque, and a second clutch is carrying torque.

3. The system of claim 1 further comprising:
a min detection module that detects a minimum value of the filtered acceleration generated during one of a first predetermined period and a second predetermined period; and
a max detection module that detects a maximum value of the filtered acceleration generated during one of the second predetermined period and a third predetermined period,
wherein the second predetermined period is after the first predetermined period and the third predetermined period is after the second predetermined period,
wherein the desired pressure module ends the increase and decreases the desired pressure during one of the first and second predetermined periods, and
wherein the capacity detection module indicates whether the clutch reached torque carrying capacity further based on the minimum and maximum values.

4. The system of claim 3 wherein the capacity detection module indicates whether the clutch reached torque carrying capacity further based on a first time when the minimum value occurred and a second time when the maximum value occurred.

5. The system of claim 4 further comprising a noise detection module that indicates whether noise in the acceleration is greater than a predetermined noise based on a difference between the acceleration and a previous value of the acceleration,
wherein the capacity detection module indicates whether the clutch reached torque carrying capacity further based on whether the noise is greater than the predetermined noise.

6. The system of claim 5 wherein the capacity detection module indicates that the clutch reached torque carrying capacity when the noise is less than the predetermined noise, a second difference between the maximum and minimum values is greater than a first predetermined acceleration, the second time is after the first time, and a period between the first and second times is less than a predetermined period.

7. The system of claim 6 wherein the capacity detection module indicates that the clutch reached torque carrying capacity when the second difference is greater than a second predetermined acceleration that is greater than the first predetermined acceleration.

8. The system of claim 3 further comprising a noise detection module that indicates whether noise in the acceleration is greater than a predetermined noise based on a difference between the acceleration and a previous value of the acceleration, wherein the capacity detection module indicates that the clutch reached torque carrying capacity when the noise is greater than the predetermined noise and a second difference between the maximum and minimum values is greater than a predetermined acceleration.

9. The system of claim 1 further comprising a parameter learning module that determines a volume of the hydraulic fluid to cause the clutch to reach torque carrying capacity in response to capacity detection module indicating that the clutch reached torque carrying capacity.

10. The system of claim 1 further comprising a parameter learning module that determines a pressure of the hydraulic fluid to overcome a return spring of the clutch in response to capacity detection module indicating that the clutch reached torque carrying capacity.

11. A method comprising:
selectively generating an increase in a desired pressure of hydraulic fluid for a clutch of an automatic transmission;
actuating a solenoid valve based on the desired pressure, wherein the solenoid valve supplies hydraulic fluid to a regulator valve, and the regulator valve supplies hydraulic fluid to the clutch;
filtering an acceleration of a shaft of the automatic transmission to generate a filtered acceleration; and
indicating whether the clutch reached torque carrying capacity based on the filtered acceleration.

12. The method of claim 11 further comprising generating the increase when a vehicle speed is greater than zero, the clutch is not carrying torque, and a second clutch is carrying torque.

13. The method of claim 11 further comprising:
detecting a minimum value of the filtered acceleration generated during one of a first predetermined period and a second predetermined period; and
detecting a maximum value of the filtered acceleration generated during one of the second predetermined period and a third predetermined period,
wherein the second predetermined period is after the first predetermined period, and the third predetermined period is after the second predetermined period;
ending the increase and decreasing the desired pressure during one of the first and second predetermined periods; and
indicating whether the clutch reached torque carrying capacity further based on the minimum and maximum values.

14. The method of claim 13 further comprising indicating whether the clutch reached torque carrying capacity further based on a first time when the minimum value occurred and a second time when the maximum value occurred.

15. The method of claim 14 further comprising:
indicating whether noise in the acceleration is greater than a predetermined noise based on a difference between the acceleration and a previous value of the acceleration; and
indicating whether the clutch reached torque carrying capacity further based on whether the noise is greater than the predetermined noise.

16. The method of claim 15 further comprising indicating that the clutch reached torque carrying capacity when the noise is less than the predetermined noise, a second difference between the maximum and minimum values is greater than a first predetermined acceleration, the second time is after the first time, and a period between the first and second times is less than a predetermined period.

17. The method of claim 16 further comprising indicating that the clutch reached torque carrying capacity when the second difference is greater than a second predetermined acceleration that is greater than the first predetermined acceleration.

18. The method of claim 13 further comprising:
indicating whether noise in the acceleration is greater than a predetermined noise based on a difference between the acceleration and a previous value of the acceleration; and
indicating that the clutch reached torque carrying capacity when the noise is greater than the predetermined noise and a second difference between the maximum and minimum values is greater than a predetermined acceleration.

19. The method of claim 11 further comprising determining a volume of the hydraulic fluid to cause the clutch to reach torque carrying capacity in response to the indication that the clutch reached torque carrying capacity.

20. The method of claim 11 further comprising determining a pressure of the hydraulic fluid to overcome a return spring of the clutch in response to capacity detection module indicating that the clutch reached torque carrying capacity.

* * * * *